United States Patent Office 3,332,341
Patented July 25, 1967

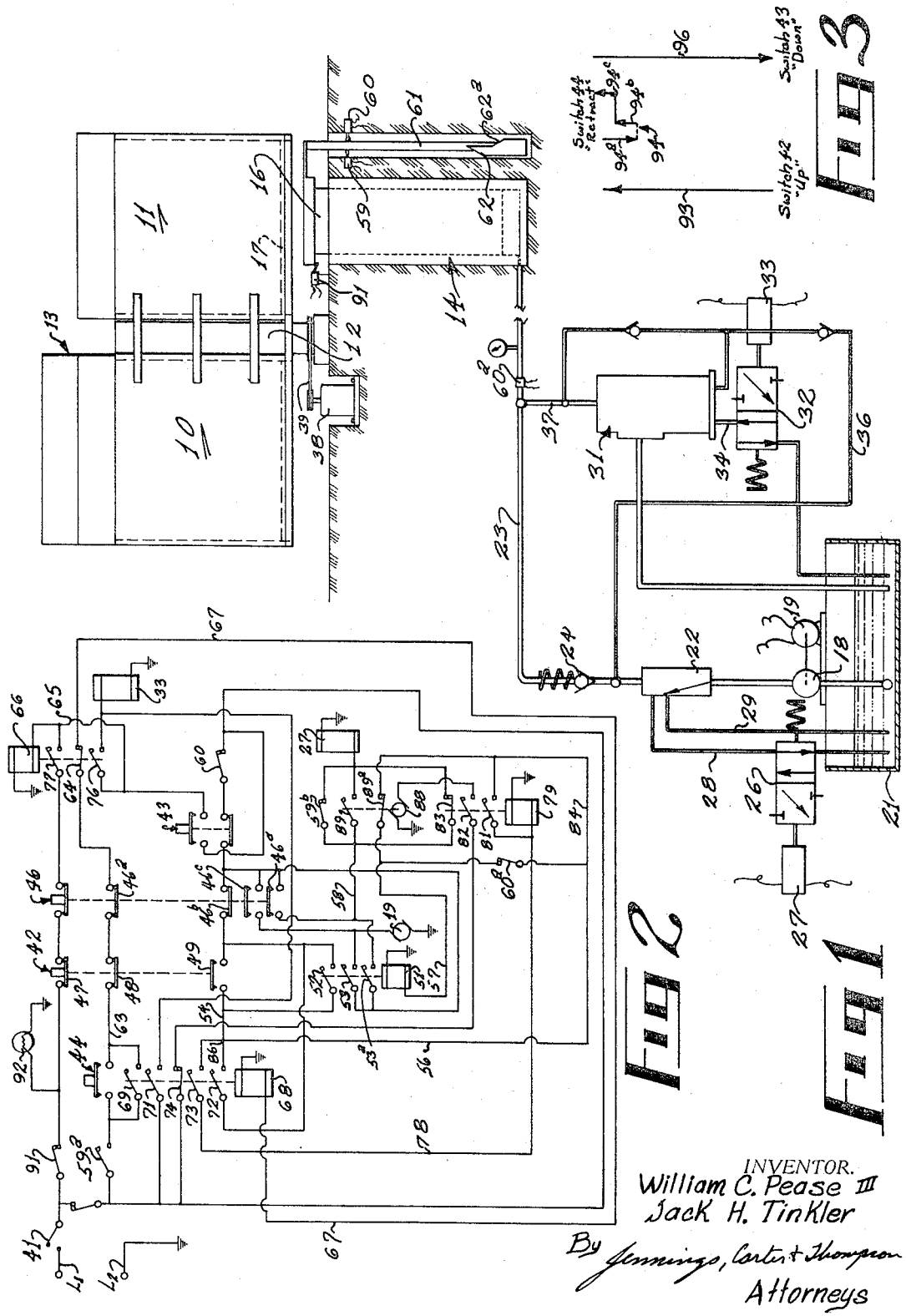

3,332,341
CONTROL SYSTEM FOR BALING PRESSES AND
ASSOCIATED APPARATUS
William C. Pease III and Jack H. Tinkler, both %
Lummus Cotton Gin Co., Columbus, Ga.
Filed Sept. 3, 1965, Ser. No. 484,816
4 Claims. (Cl. 100—53)

Our invention relates to baling presses, especially to presses for baling fibers such as cotton.

Heretofore in this art when reciprocating ram-type baling presses have been used for baling fibers such as cotton, a considerable number of manual manipulations of the ram have been required. Thus, when the ram has packed out a bale and after the wrappings and ties have been applied, the baling cycle heretofore has been substantially as follows: The press operator manually actuates a switch or lever removing the ram from the bale, the ram is stopped, the bale is ejected from the press, the ram is then brought back into the baling area, within the box, the ram is "dressed," namely, the bagging or wrapping for the subsequent bale is draped about it, and the ram finally is returned to its withdrawn position. As will be apparent, and as heretofore designed and constructed, each time the ram is moved the operator heretofore has been required manually to actuate a button or lever, thus resulting in considerable loss of time and labor.

Our invention has for its prime object the elimination of many of these manual operations, thereby to provide a baling press which in operation results in a saving of labor in these pressing, bagging and tieing operations.

Briefly and broadly, our invention provides a control system for the press which, when manually actuated, is effective to withdraw the ram from a bale which has just been compressed, automatically stop the ram platen in proper position for bale ejection, hold the ram at this stop position for a set time interval while the bale is ejected, and then automatically return the ram to proper position for dressing the ram platen.

As will further appear, an object of our invention is to provide apparatus of the character designated which may be with equal facility applied to an unpacking, single or double acting ram, single or double press box. It may likewise be applied to a downpacking, double acting ram, single or double box press.

Apparatus illustrating features of our invention is shown in the accompanying drawings forming a part of this application in which:

FIG. 1 is a wholly diagrammatic view illustrating principally the hydraulic control mechanisms for our improved press;

FIG. 2 is a wiring diagram; and

FIG. 3 is a wholly schematic diagram representing an operating cycle of our improved press.

Referring now to the drawings for a better understanding of our invention, we show in FIG. 1 a double box, up-packing, hydraulic ram operated baling press. As illustrated, the press comprises the two separate boxes 10 and 11, mounted on a central, vertical upright column 12 so that the boxes may move from beneath a filling mechanism such as a tramper indicated diagrammatically at 13 to a position with the thus filled, loosely packed cotton over an up-packing ram indicated generally at 14. The piston 16 of the ram cooperates with a platen 17 which disposed within press box whereby upon upward movement of the ram the platen compresses the fiber into a bale.

We will first describe the hydraulic system for our improved press and then we will describe the control means for such hydraulic means.

As is customary, we provide at 18 a pump driven by an electric motor 19. The pump picks up hydraulic fluid from a reservoir 21 and, through a relief valve 22 delivers the fluid through a main line 23 to the bottom of the ram 14, which in the instance shown is an up-packing single acting ram. Interposed in the line 23, past the relief valve 22 is a check valve 24 which may be set to open at a pressure on the order of around 75 pounds, for a purpose later to appear.

At 26 we illustrate a spool-type valve which is under control of a solenoid 27. The valve 26, when in the position illustrated in FIG. 1 is permitting fluid to by-pass through the relief valve 22, from line 28 back into the reservoir 21. The purpose of this is to permit the pump 18 to be in operation and thus primed, prior to the time it is required to force fluid into the bottom of the ram. Furthermore, line 29 is provided from relief valve 22 so that when the piston 16 of the ram is chockablock, in its uppermost position, fluid bypasses through the valve 22 back to the reservoir.

As will later appear, when the solenoid 27 operates valve 26, fluid under pressure goes from the pump 18, valve 22, line 23, into the bottom of the ram, raising the piston 16 and the platen 17.

Although not absolutely essential to our invention, we prefer to employ a dump valve indicated generally at 31. This valve and its control means is shown, described and claimed in Letters Patent No. 3,073,287, issued Jan. 15, 1963, to D. W. Van Doorn et al. The purpose of the valve 31 and associated control means therefor is to relieve the pressure on the ram 14 without shock. Suffice it to say that a pilot valve 32, under control of a solenoid 33 is connected to the valve 31 through a line 34. A by-pass line 36 connects the upper end of the valve 31 from the line leading from valve 22, downstream, or ahead of the check valve 24. A line 37 connects the upper end of the valve 31 to the main fluid supply line 23. The operation and function of the valve 31 and its associated pilot valve 32 will be later described more in detail.

Reverting again to the press per se, it will be understood that the boxes 10 and 11 may be rotated to their respective positions by means of an electric motor 38 and a chain or the like 39 which passes around sprockets on the motor shaft and on the column 12. Referring now to FIG. 2 of the drawings, we will now describe the electrical circuit for controlling our improved press, partially through the hydraulic means already described.

Power for the entire system may be supplied through the lines L1 and L2. A manually operated master switch is illustrated at 41. Essentially, the manual control switches for our improved circuit comprises the up switch illustrated at 42, the down switch illustrated generally at 43, a retract switch illustrated generally at 44 and an emergency or stop switch illustrated generally at 46. From FIG. 2 it will be seen that the up switch comprises two normally closed sets of contacts 47 and 48 and one normally open set of contacts 49.

At 51 we show a relay which has three sets of normally open contacts 52, 53 and 53a. When the manual up button 42 is pressed to a position to close contacts 49, the coil of relay 51 is energized through the lines 54, 56 and 57, and the normally closed pressure switch 60a, thence to the ground corresponding to line L2. The set of contacts 52, being in parallel with the switch contacts 49, act as a holding circuit for the coil of relay 51. Closing of contacts 53 energizes the pump motor 19. Also, the closing of contacts 53a energizes solenoid 27 through the lines 58, through the parallel circuit which includes a normally closed limit switch 59b and a pair or normally closed contacts 83 controlled by a relay coil 79, later to be described. Limit switch 59 is physically mounted relative to the movable piston as to be operated when the ram moves upwardly, as will later be explained. Energization of the solenoid 27 closes off the bleed line 28, causing the fluid to pass directly from the pump, through valve 22, line 23, and thence into the ram to raise the platen. Switch 59 is also equipped with another set of contacts 59ª, FIG. 1, which are normally open. As shown in FIG. 1, the ram may be provided with a vertically movable actuating member 61, which carries a cam 62 for actuating switch 59 as the platen approaches full compaction position. Thus, when the ram is energized and has compacted the bale contacts 59$^b$ are opened and contacts 59$^a$ are closed. A second cam 62$^a$ carried by member 61 is effective to open a limit switch 60. Opening switch 60 deenergizes relay 51, thus stopping pump motor 19 and deenergizing solenoid 27. This operation of switches 59 and 60 readies the circuit for operation upon the retract cycle, awaiting manual closing of the retract switch 44. Upon deenergization of solenoid 27 the pilot valve 26 moves back to the position shown in FIG. 1, namely, connecting line 23 from valve 22 back to the reservoir 21. However, due to check valve 24 the fluid is trapped in the ram, it being remembered that it is valve 31 and its associated mechanism which drains the fluid from the ram.

The bale is now compacted and, assuming that one is baling cotton in the apparatus, the ties are placed about the bale and fastened while it is held in compacted position. The next step in the operation is to eject the bale from the press and subsequently, as soon as possible thereafter, dress the platen, making ready for withdrawal of the platen 17 and removal of the piston 16 from the box 11 so that the press may turn to bring the now loosely filled box 10 into position over the piston.

In carrying out the foregoing, the next step is for the operator to press the manual retract button or switch 44. Momentary closing of switch 44 brings about the following sequence of operations. Remembering that 59$^a$ is closed, the closing of switch 44 establishes a circuit through the line 63, contacts 48, 46$^a$, through a set of normally closed contacts 64 under control of a relay 66 which later will be described, thence through line 67 through the coil of a relay 68. A set of contacts 69, in parallel with the switch contacts 44, act as a holding circuit so that momentary closing of 44 establishes a holding circuit for the coil of relay 68. Relay 68, in addition to contacts 69, has normally open contacts 71, 72, 73, and a set of normally closed contacts 74. Relay 66 has two normally open sets of contacts 76 and 77, in addition to the normally closed set of contacts 64. The closing of contacts 71 energizes the solenoid 33 which operates the pilot valve 32 of the dump valve 31. Energization of coil 68 also closes contacts 72 and 73 and opens 74. Closing of contacts 72 readies the circuit to provide current to the point in the circuit indicated by the numeral 86 as soon as switch 60 is closed, as will be described hereinafter. The closing of 73 thus completes the circuit through the line 78, to the coil 79. When coil 79 is energized contacts 81 and 82 close and contacts 83 open. Contacts 81 act as a holding circuit for the coil 79 as shown.

Because, as stated above, solenoid 33 is activated through contacts 71, the fluid continues to drain from the bottom of the ram through the valve 31 back to the reservoir until such time as a cam 62$^a$ permits switch 60 to close again. The closing of switch 60 energizes relay 79 through the now closed sets of contacts 73 and also energizes relay 51 through line 56 from the point 86. Closing contacts 52, controlled by relay 51, provides an alternate path for the current to reach point 86 of the circuit. The closing of contacts 82 controlled by relay 79 readies the circuit for activating a timer indicated at 88 upon closing of contacts 74, as will appear. The timer controls two sets of contacts 89 and 89$^a$. The closing of relay 51 again energizes the pump motor 19, but solenoid 27 does not operate to let fluid into line 23, contacts 83, contacts 89 and switch 59$^b$ being open. Thus the ram continues to fall until the contacts 59$^a$ again open, and upon the later occurrence relay 68 is deenergized closing contacts 74, setting in operation the timer 88, and deenergizing solenoid 33. Deenergization of solenoid 33 moves the pilot valve 31, trapping the remaining fluid under the ram. Since the pump is still in operation and contacts 59$^b$ are closed, the ram now starts back up, and continues this upward movement until switch contacts 59$^b$ are again opened by cam 62, thus deenergizing solenoid 27 and stopping upward movement of the ram. The timer 88 now is still in operation and after it times out, it closes contacts 89. The closing of contacts 89 again energizes the solenoid 27, putting fluid back into line 23, raising the ram until the switch 60 is opened by the cam surface 62$^a$, whereupon the retract cycle is completed. Thus at the end of the retract cycle the platen is in position to be dressed out with the bagging.

In the event the bale has not been removed before the ram starts upwardly on the last stroke of the retract cycle, the ram is stopped by a pressure switch 60$^a$ provided in line 23 which is adapted to open when the pressure in the line exceeds that required to raise the platen. In parallel with switch 60$^a$ is a set of normally closed contacts 89$^a$ controlled by the timer. Thus, until the timer is activated and times out, the pressure switch 60$^a$ has no effect upon the circuit. After the timer operates contacts 89$a$ switch 60$^a$ operates as a safety switch to prevent raising of the platen in the event the bale was not removed from the press.

The final operation requires that the piston be removed completely from the box 11 to permit the motor 38, when energized by means not shown, to rotate the press boxes to bring the now loosely filled box 10 over the ram. This final operation is initiated by pressing the down button 43, thus energizing relay 66 through line 65. Energizing relay 66 closes contacts 76 and 77 and opens contacts 64. Closing contacts 76 activates solenoid 33, thus operating pilot valve 32 to open valve 31 and allow fluid to flow from the ram 14 back to tank 21. Closing contacts 77 establishes a holding circuit for relay 66, while opening contacts 64 prevents accidental starting of the pump. As soon as the piston is lowered sufficiently to open a normally closed limit switch 91 and thereby break the holding circuit of contacts 77, thus deactivating relay 66, a new cycle is ready to begin. A red light 92 may be provided to indicate that switch 91 is closed.

From the foregoing it will be seen that our improved control means eliminates a considerable amount of lost time and a considerable number of manual operations in the operation of baling presses. As best illustrated in FIG. 3, we can now simply and accurately review the entire sequence of operations. Thus, the line 93 represents the up movement of the platen which is in response to pressing the up button 42. This is the packing stroke of the ram and the ram is held with the bale compressed so that the operators may place the ties about the bale and secure them. Pressing of the retract button 44 automatically brings about the sequence of operation illustrated by the 94 in FIG. 3. That is, the line 94$^a$ illustrates a down movement, permitting the bale to expand against the ties, and, leaving sufficient room to eject the bale, followed immediately by a slight up movement indicated by the line 94$^b$, called in the trade the "hunching" of the platen. The purpose of this is to aid in discharging the bale. The platen now is held at the level indicated by the top of the arrow of the line 94$^b$ for a length of time sufficient to permit the operator to remove the bale from the press. Having accomplished this, and automatically, after timing out of the timer 88, the platen is moved still further upwardly as indicated by the line 94$^c$. This is up to a position where the platen may be dressed, namely, the bagging for a new bale put upon it. The safety pressure switch will stop the final up-stroke in the event the bale was not removed at the proper time. Pressing of the downbutton 43 then moves the dressed platen downwardly as illustrated by the line 96 to the bottom of the box 11, while the piston moves clear of the box, opening switch 91, resetting the entire mechanism for the new cycle and permitting the boxes to rotate.

From the foregoing it will be seen that we have devised an improved, automated press which is especially adapted for the baling of fibers. By the provision of the means to lower the press from the full compaction position downwardly enough to release the bale to its own inherent tension and give room to allow for removal of the bale and then immediately upwardly, to help in discharging the bale and then, automatically up to a dressing position, we have eliminated considerably the number of manual operations required of the pressmen. Further, we accurately determine the extent of these movements of the platen and thus due to that reason improve the overall efficiency of the apparatus.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What is claimed is:

1. In an automated baling press of the type having a press box and a platen adapted for movement relative to each other by the piston of a fluid pressure cylinder,
   (a) means to admit fluid to the cylinder to move the piston and hence the platen on its working stroke,
   (b) electro-fluid controls embodying timing and sequence mechanism effective when energized and when the piston is at the packing end of its stroke to cause the piston first to retract sufficiently to free the bale in the box for removal of the same, second, to move in the compacting direction a predetermined distance but less than the amount that it has just retracted, and third, to move a further predetermined distance into the press box, whereby said first and second movements just named aid in discharging the bale from the press box and said third movement just named positions the platen for dressing with bale wrapping for the next bale,
   (c) manually actuable electro-fluid controls for retracting the piston and hence the platen from the press box, and,
   (d) means effective upon withdrawal of the platen to ready the control apparatus for a subsequent cycle.

2. Apparatus as defined in claim 1 in which said timer mechanism in said control circuits is effective to hold the platen for a predetermined time in said second named position, whereby during said time the platen is so held the bale may be removed from the press box.

3. In an automated baling press of the type having a press box and a platen adapted for movement relative to each other by the piston of a fluid pressure cylinder,
   (a) means to admit fluid to the cylinder to move the piston and hence the platen on its working stroke,
   (b) electro-fluid controls embodying timer and sequencing mechanism effective when energized and when the piston is at the packing end of its stroke to cause the piston first to retract sufficiently to free the bale in the box for removal of same, second to move further into the press box, a predetermined distance whereby said first movement just named aids in discharging the bale from the press box and said second movement just named positions the platen for dressing with bale wrapping for the next bale,
   (c) manually actuable electro-fluid controls for retracting the piston from the press box, and
   (d) means effective upon withdrawal of the piston to ready the control apparatus for a subsequent cycle.

4. In an automated baling press embodying press box, a fluid pressure ram and a platen operated thereby, control means for operating the ram comprising:
   (a) a source of fluid under pressure,
   (b) control means for supplying said fluid to the ram and releasing the same therefrom,
   (c) said control means embodying electrically operated timing and sequence mechanism effective when actuated to move the ram and hence the platen in the following order:
      (1) withdrawal stroke followed by partial movement toward compaction;
      (2) pause for a period of time to permit removal of bale;
      (3) further movement toward compaction to a predetermined position to permit dressing the platen; and
   (d) a manually actuated control effective to withdraw the dressed platen from the press box thereby to ready the press for a new sequence of operation.

References Cited

UNITED STATES PATENTS

| | | | |
|---|---|---|---|
| 2,780,987 | 2/1957 | Wall | 100—53 X |
| 2,882,816 | 4/1959 | Van Doorn et al. | 100—53 |
| 2,963,959 | 12/1960 | Van Doorn et al. | 100—223 X |
| 3,024,719 | 3/1962 | Englund | 100—53 X |
| 3,040,653 | 6/1962 | Neitzel | 100—223 X |
| 3,252,409 | 5/1966 | Merkel et al. | 100—223 |

BILLY J. WILHITE, *Primary Examiner.*